Jan. 8, 1963   O. C. HOLDERER   3,072,378
GATE VALVE
Filed Sept. 9, 1960   3 Sheets-Sheet 2

Oscar C. Holderer,
INVENTOR.

BY S. J. Rotondi
A. T. Dupont
Jack W. Voigt

Jan. 8, 1963     O. C. HOLDERER     3,072,378
GATE VALVE

Filed Sept. 9, 1960     3 Sheets—Sheet 3

Oscar C. Holderer,
INVENTOR.

BY *S. J. Rotondi*
*A. T. Dupont*
*Jack W. Voigt*

United States Patent Office 3,072,378
Patented Jan. 8, 1963

3,072,378
GATE VALVE
Oscar C. Holderer, Huntsville, Ala., assignor to the United States of America as represented by the Secretary of the Army
Filed Sept. 9, 1960, Ser. No. 55,101
8 Claims. (Cl. 251—31)
(Granted under Title 35, U.S. Code (1952), sec. 266)

The invention described herein may be manufactured and used by or for the Government for governmental purposes without the payment of any royalties thereon.

This invention relates to a gate valve. Such a valve is useful in fluid pressure lines where a high pressure differential exists, such as in a wind tunnel.

In view of these facts, an object of this invention is to provide a gate valve which can be easily operated while a pressure differential is applied against the valve.

Another object of the invention is to provide a gate valve, which does not depend on the pressure differential for seating the valve.

A further object is to provide a gate valve, which eliminates the need for a means to equalize the pressure on each side of the valve before the valve is operated.

The foregoing and other objects of this invention will become more fully apparent from the following detailed description of the invention and from the accompanying drawings, in which.

Figure 1:
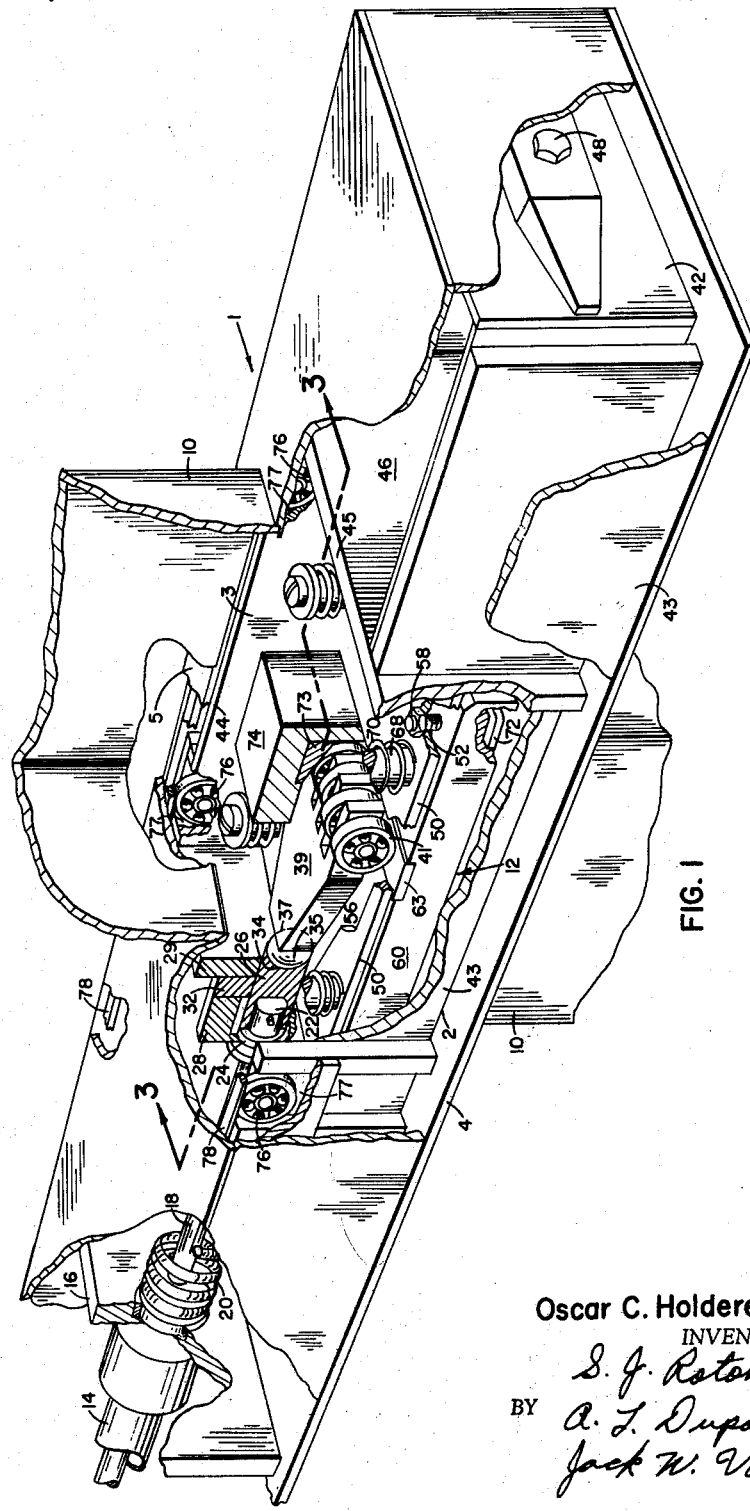
FIGURE 1 is a pictorial view, partly broken away, of the invention.
Figure 2:
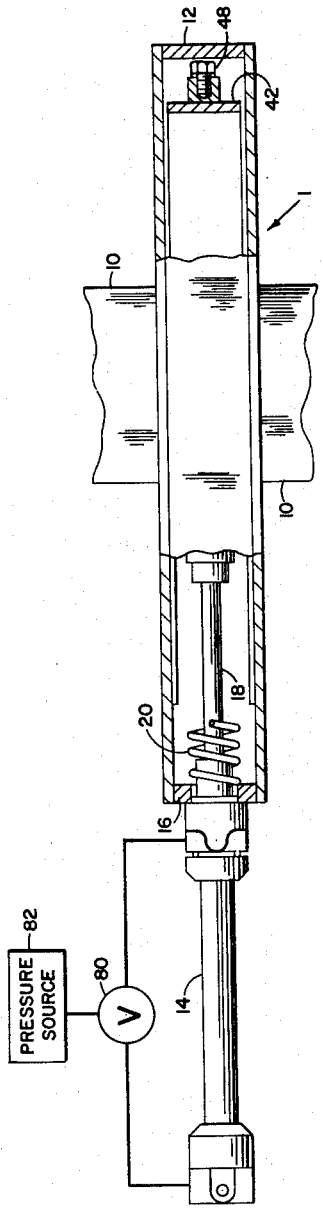
FIGURE 2 is a reduced elevational view, partly in section, of FIGURE 1.

In the drawings, wherein for the purpose of illustration the invention is shown, the numeral 1 designates a hollow housing provided with apertures 2 and 3 in sides 4 and 5 respectively. The apertures have recesses, which are adapted to receive the ends of a sectional fluid pressure line 10. The housing encloses a movable gate-valve assembly 12 which is actuated to open, or to close said pressure line by hydraulic motor 14. This motor is secured to end 16 of housing 1 and has a piston rod 18 extending through end 16 for connection to assembly 12. End 16 has a spring 20 connected thereto, internally of said housing, for providing gate-valve assembly 12 with a resilient stop and means for initiating downward movement of said assembly.

The end of rod 18, connected to assembly 12, is secured to the end of element 22, by a pin or other suitable means which is provided with an enlarged portion 24. Portion 24 abuts one end of assembly 12 to provide a connection between assembly 12, rod 18 and portion 24. The other end of element 22 is slidably fitted in one end of a socket 26. Enlarged portion 24 is retained in a hollow element 28, provided with an end aperture for receiving rod 18, which is secured to apertured end plate 29, of gate-valve assembly 12, by screws 30. The screws also retain an apertured movement limiter 32 in a position intermediate element 28 and end plate 29. The aperture in plate 29 and limiter 32 are aligned to allow the other end of socket 26 to be slidably fitted through the apertures.

Figure 5:
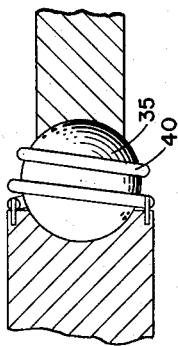
FIGURE 5 is an enlarged view, partly in section showing a means for retaining the spherical member in position when the valve is used in any plane other than a vertical plane.

The end of socket 26 contains a concave surface 34, which forms a seat for part of a spherical member 35. The spherical member has a second part which rests in a second concave surface 37 formed in one end of a rake-shaped member 39. The other end of member 39 is provided with a plurality of rollers 41, for a purpose to be described later. Each of the rollers contains an axis which is offset from the axis of the adjacent roller. The invention, as shown and described, is arranged for use with the valve in a vertical plane, but it is to be understood that a retaining means, such as a spring 40 (FIGURE 5), can be applied to spherical member 35 when it is desired to use the valve in other planes.

Plate 29, referred to above, forms part of an inner housing consisting of the other end plate 42, two side plates 43 and 44 and an intermediate plate 45. The union of plates 42, 43, 44 and 45 form an opening 46 disposed for replacement of assembly 12 when assembly 12 is removed out of contact with line 10. Plate 42 is provided with an adjustable stop 48, which serves as a second position limiter for the inner housing.

Plate 29 and intermediate plate 45 have a plate 50 secured, by welding or other suitable means, near their centers. Plate 50 is provided with a pair of threaded apertures 52, a plurality of apertures 54 and a cut-out portion 56 which is large enough to receive member 39 and the attached rollers 41. Apertures 52 are adapted to receive an adjusting bolt and lock-nut combination 58 disposed for engagement with a movable gate plate 60.

Figure 3:
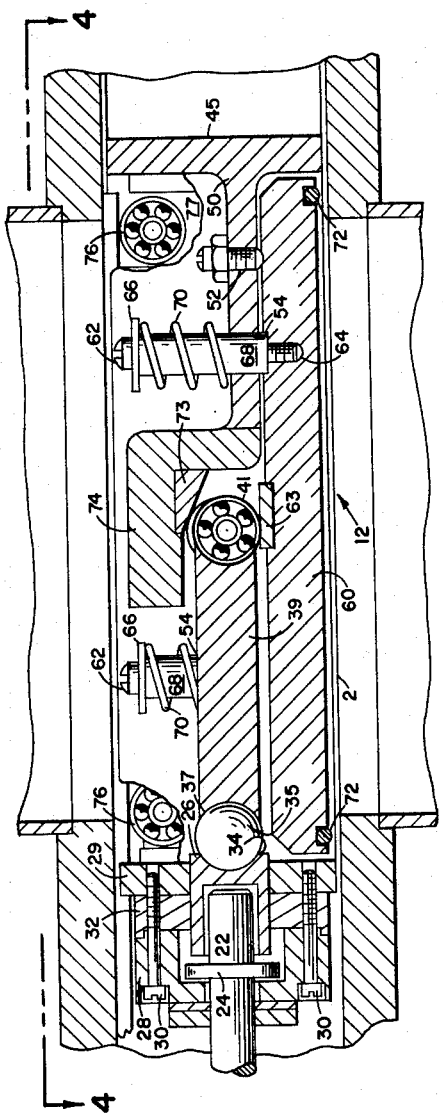
FIGURE 3 is an enlarged sectional view taken along the plane 3—3 of FIGURE 1.
Figure 4:
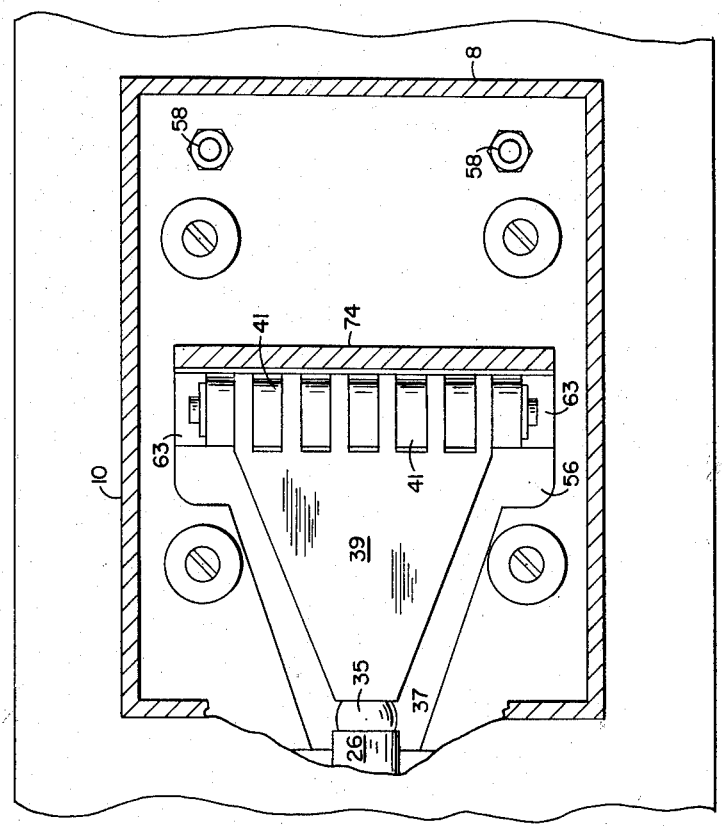
FIGURE 4 is a sectional view taken along the plane 4—4 of FIGURE 3.

Gate plate 60 is disposed below plate 50 (as shown in FIGURES 1 and 3) by a plurality of bolts 62 screwed into a plurality of threaded apertures 64 in plate 60. Plate 60 is also provided with a bar 63 which provides a roller surface for part of rollers 41. Bolts 62 are provided with flat washers 66, columns 68, having one end abutting said washers and the other end extending through apertures 54, and springs 70. These springs have one end abutting washers 66 and the other end abutting plate 50.

This arrangement insures that plate 60 is biased away from aperture 2, when pressure from wheels 41 is released. This biasing of plate 60 is necessary for protection of sealing member 72 and for freeing plate 60 for movement. Member 72 is recessed in the face of plate 60 and engages the walls around aperture 2 when plate 60 is locked in position.

The locking plate 60 is carried out by rollers 41 being moved, by actuation of fluid motor 14, to a wedged position between bar 63 and wedge 73. The wedge is integrally connected with curved member 74, which has one end extending over rollers 41 and bar 63. The other end of member 74 is secured to plate 50, by welding or other suitable means. The offset of the rollers axis (referred to above) enables part of the rollers to engage wedge 73 and the remaining rollers to engage bar 63, so that pressure is applied to plate 60, thereby locking plate 60 in position.

When the wedge is removed pressure against plate 60 would normally force the inner housing into contact with wall 5 of outer housing 1, making movement of assembly 12 difficult. However, the invention eliminates this problem by securing a plurality of wheels 76 in a plurality of cavities 77, which provide a partial housing for said wheels. These wheels are arranged for engagement with a pair of tracks 78 disposed adjacent to sides 43 and 44 of the inner housing. This arrangement prevents the inner housing from engaging the walls of the outer housing, thereby eliminating frictional engagement between the housings.

The operation of the device is as follows: with the gate valve positioned in a fluid pressure line (assuming that opening 46 is in line with the pressure line, thereby removing all obstruction to the pressure) valve 80, is operated causing fluid pressure from pressure source 82 to actuate motor 14. When actuated, motor 14 moves assembly 12 away from end 16, until movement of end 42 ceases due to stop 48 abutting an end of the outer housing and rollers 41 abut bar 63 and wedge 73, when this movement stops, opening 46 is removed from contact with apertures 2.

This abutment between rollers 41, bar 63 and wedge 73 creates pressure on gate plate 60, causing the plate to move into sealing engagement with aperture 2.

When it is desired top lace opening 46 in line with aperture 2, the flow of pressure from source 82 is reversed by operation of valve 80. This change in flow of pressure to motor 14 moves rod 18 in a direction opposite from plate 45. This movement creates space, due to lost motion, between element 22 and socket 26 which is overcome by movement of member 39 due to pressure, on plate 60, from line 10 and by biasing springs 70. Springs 70, also elevate plate 60 to prevent frictional engagement between plate 60 and the walls of the housing.

After plate 60 is elevated wheels 76 guide the gate-valve assembly along tracks 78 until movement is stopped by spring 20 and the portion of motor 14 attached to housing end 16. At this point opening 45 is in line with apertures 2 and 3 and line 10 is again free from obstruction.

It is to be understood that the form of the invention that is herein shown and described is the preferred embodiment, and that various changes in the shape, size and arrangement of parts may be resorted to without departing from the spirit of the invention, or the scope of the subjoined claims.

The following invention is claimed:

1. A gate valve, for use in a pressure line, comprising: an outer housing, provided with apertures for receipt of said line; a second housing contained in said first housing; motor means, secured to one end of said outer housing, operably connected with said second housing for movement of said second housing; a movable gate valve assembly, disposed inside said second housing, having a gate plate, a rake-shaped member positioned adjacent said gate plate, a plurality of rollers secured to one end of said rake-shaped member, an apertured section, and a plate adjacent said gate plate and rigidly connected to said inner housing, said plate being provided with a cutout portion disposed for receiving said rake-shaped member and said rollers; connector means, connecting said valve assembly to said motor, for moving said valve assembly to a first position wherein said gate plate is positioned for registry with and restriction of said pressure line and for moving said valve assembly to a second position, wherein said apertured section is in connection with said pressure line; means for preventing frictional engagement between said first housing and said second housing during movement of said second housing; means providing a force for biasing said gate plate away from said position of restriction of said pressure line; and means for overcoming the force of said biasing means and the force in said pressure line to maintain said gate plate in said position of registry with and restriction of said pressure line.

2. A device as set forth in claim 1, in which said motor means is controlled by a source of fluid pressure and a two-way control valve.

3. A device as set forth in claim 1, in which said plate, provided with a cutout portion, is provided with means for adjusting said gate plate relative to said pressure line.

4. A device as set forth in claim 1, in which said gate plate is provided with a partially recessed sealing gasket.

5. A device as set forth in claim 1, in which said connector means comprises a ball and socket joint connected to said motor through a lost motion joint.

6. A device as set forth in claim 1, in which said means for preventing frictional engagement comprises a plurality of wheels partially enclosed by said second housing, and a plurality of tracks disposed for coaction with said wheels.

7. A device as set forth in claim 1, in which said means for providing a biasing force on said gate plate comprises a plurality of bolts attached to said gate plate; a plurality of columns attached to said bolts; a plurality of washers separating said columns from said bolts and a plurality of springs having one end abutting said washers.

8. A device as set forth in claim 1, in which said means for overcoming said biasing force comprises a bar and a superimposed wedge arranged for coaction with said rollers secured to said rake-shaped member, whereby operation of said motor forces said last-named rollers between said bar and wedge, thereby creating a force on said gate plate, in a direction toward said pressure line, and moving said gate plate into sealing position.

References Cited in the file of this patent
UNITED STATES PATENTS

| | | |
|---|---|---|
| 916,831 | Bettinger | Mar. 30, 1909 |
| 1,300,918 | Bloch | Apr. 15, 1919 |
| 2,676,780 | Wheatley | Apr. 27, 1954 |
| 2,819,034 | Holderer | Jan. 7, 1958 |